United States Patent
Han

(10) Patent No.: US 6,560,271 B1
(45) Date of Patent: May 6, 2003

(54) PSEUDO NOISE CODE ACQUISITION APPARATUS FOR DIRECT SEQUENCE SPREAD SPECTRUM COMMUNICATIONS

(75) Inventor: Chung-Seok Han, Yongin-shi (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/222,456

(22) Filed: Dec. 29, 1998

(30) Foreign Application Priority Data

Dec. 29, 1997 (KR) .............................. 97-75984

(51) Int. Cl.[7] .............................. H04B 1/707
(52) U.S. Cl. .................. 375/137; 375/136; 375/142; 375/150; 375/343; 375/367
(58) Field of Search ................... 375/138, 147, 375/148, 149, 134, 145, 130, 150, 136, 137, 142, 152, 343, 367; 370/208, 209, 515

(56) References Cited

U.S. PATENT DOCUMENTS 5,222,100 A  * 6/1993 Lundquist et al. .......... 375/149
5,724,384 A  * 3/1998 Kim et al. ................... 375/149
5,940,432 A  * 8/1999 Saito et al. ................. 375/148
5,970,084 A  * 10/1999 Honda ........................ 375/147

* cited by examiner

Primary Examiner—Shuwang Liu
(74) Attorney, Agent, or Firm—Dilworth & Barrese, LLP

(57) ABSTRACT

A pseudo noise code acquisition apparatus in a direct sequence spread spectrum receiver capable of minimizing a retard involved in the updating of a pseudo noise code sequence, thereby achieving a reduction in pseudo noise code acquisition time. The apparatus is configured to conduct a pseudo noise code update prior to a threshold comparison after a spread spectrum signal is subjected to despreading and correlation for a desired number of chips. By this configuration, when it is determined, based on the result of the threshold comparison, that acquisition of a desired pseudo noise code has failed, it is possible to receive data associated with a new pseudo noise sequence without any delay.

3 Claims, 3 Drawing Sheets

PSEUDO NOISE CODE ACQUISITION APPARATUS FOR DIRECT SEQUENCE SPREAD SPECTRUM COMMUNICATIONS

BACKGROUND OF THE INVENTION

1. Field of the Invention

The present invention relates synchronization in a direct sequence spread spectrum receiver used in radio communication systems, and more particularly it relates to a pseudo noise (PN) code acquisition apparatus for direct sequence spread spectrum communications.

2. Description of the Related Art

A direct sequence spread spectrum communication system is a system in which, in response to an output signal from a transmitter end, which has been spread across a spectrum using a PN code and modulated onto a carrier, a receiver end generates the same PN code as that included in the signal received thereto, and despreads the received signal based on the generated PN code, thereby obtaining the original signal.

FIG. 1 is a block diagram illustrating the configuration of a conventional PN code acquisition apparatus. A spread spectrum signal transmitted from a direct sequence spread spectrum system over a radio channel is received in the PN code acquisition apparatus via a receiving antenna and then down converted. The down-converted received signal, which is denoted by the reference character "S1", is inputted at a despreading unit 12 after passing through a matched filter 11 for obtaining a maximum signal to noise ratio (SNR). The despreading unit 12 despreads the received signal by multiplying the signal by a spread code synchronized therewith so that the signal, which is in a spread modulated state, is demodulated. That is, the despreading unit 12 despreads the matched-filtered, received signal S1 by a PN code generated from a PN code generator 13.

The resultant despread signal is then sent to a correlator 14 which, in turn, accumulates the received signal for a certain period of time, Td. A threshold comparing unit 15 receives an output from the correlator 14. The threshold comparing unit 15 compares the output signal from the correlator 14 with a predetermined threshold value, thereby checking whether or not the PN code generated from the PN code generator 13 is synchronized with the spread PN code of the received signal S1. Based on the checked result, the threshold comparing unit 15 determines whether or not a desired PN code is acquired. That is, when it is determined that the output signal from the correlator 14 is higher than the threshold value, it is determined that acquisition of a desired PN code is achieved. When it is determined that the output signal from the correlator 14 is not higher than the threshold value, it is determined that acquisition of a desired PN code has failed. In the latter case, a PN code update signal is applied to a voltage control oscillator (VCO) 16 so as to hold (i.e., delay) the PN code sequence by one chip. Thus, PN code updating is conducted. Thereafter, the above procedure is repeated.

Meanwhile, if the period of the PN code is too long, the despread and correlation may be then conducted for the entire stage of the PN code sequence in the worst case. In such a case, the PN code acquisition time may greatly affect the system performance. Practically, in CDMA IS-95 systems, it is very important to achieve a fast PN code acquisition because they use a maximal linear PN code generator adapted to generate a PN code sequence with a period of 32768 ($2^{15}$) chips at most.

FIG. 2 is a schematic view illustrating the entire period of a PN code sequence in the form of a circle in order to facilitate the explanation of updating the PN code sequence. In FIG. 2, "PN[i]" represents a stage offset from an initial stage "PN[0]" by I chips. The term "one chip hold" means a procedure for offsetting a generated PN code sequence, based on an input signal, from a PN code generator by one chip when it is determined that PN code acquisition has failed at a stage "PN[i]", thereby shifting the stage "PN[i]" to a stage "PN[i+1]", and then again conducting a PN code acquisition procedure for the input signal at the stage "PN[i+1]".

In the apparatus shown in FIG. 1, the VCO 16 is controlled based on the PN code update signal generated from the threshold comparing unit 15 in order to control, via hardware, the generation of input clocks, namely, the chip rate, such that the generation of input clocks is prevented for one chip. That is, the PN code generator 13 is controlled such that its output has an offset corresponding to one chip.

FIG. 3 is a schematic view illustrating a retard resulting from a PN code sequence update operation carried out in the conventional apparatus.

Problems occur when a PN code sequence update is carried out in the above mentioned manner. That is, the processing of input data is conducted for newly input data after the PN code generator shifts in stage from the current stage "PN[i]" to the next stage "PN[i+1]" while ignoring data received during the threshold comparison which is conducted after a correlation for N chips at the current stage "PN[i]". However, this operation results in an unnecessary delay. Where a PN code sequence to be sought has an offset of N chips from the initial stage, a delay corresponding to N chips occurs. If "N" is large in this case, the PN code acquisition is then significantly delayed. This results in a great degradation in the entire system. Furthermore, in direct sequence spread spectrum systems, PN code acquisition is conducted, prior to a carrier recovery, in the demodulation operation. For this reason, the input signal is subjected to a square processing after the spreading and correlation thereof, thereby removing frequency phase components therefrom. That is, a non-coherent synchronization is conducted. Due to such additional operations, the time taken until the threshold comparison for one PN code sequence is lengthened. Moreover, the delay time is further lengthened where it is determined that acquisition of a desired PN code has failed. When the correlation, square processing, and threshold comparison are conducted using a digital signal processing unit, the delay time is also considerably lengthened.

SUMMARY OF THE INVENTION

Accordingly, an object of the present invention is to provide a PN code acquisition apparatus capable of minimizing the delay time involved in the updating of a PN code, thereby achieving a reduction in PN code acquisition time.

In accordance with the present invention, this object is accomplished by providing a pseudo noise code acquisition apparatus in a receiver adapted to receive a spread spectrum modulated signal comprising: a pseudo noise code generator for generating a pseudo noise code; a voltage control oscillator for adjusting a pseudo noise code sequence of said pseudo noise code generator; a despreading unit for despreading a spread spectrum modulated signal received in said apparatus in sync with said pseudo noise code; a correlator for accumulating said despread signal for a predetermined number of chips, thereby deriving a correlation value while sending, to said pseudo noise code generator, a control signal adapted to hold said pseudo noise code sequence by one chip every time a correlation for said predetermined number of chips is completed; and a threshold comparing unit for comparing said correlation value output from said correlator with a predetermined threshold value, thereby determining whether or not acquisition of a desired pseudo noise code is achieved, said threshold comparing unit generating a control signal adapted to advance said pseudo noise code sequence by one chip when it is determined that acquisition of a desired pseudo noise code is achieved.

In this apparatus, a PN code update is conducted prior to the threshold comparison after the spread spectrum signal is subjected to despreading and correlation for a predetermined number of chips. By this configuration, when it is determined, based on the result of the threshold comparison, that acquisition of a desired PN code has failed, it is possible to receive data associated with a new PN sequence without any retard. That is, the present invention eliminates a time delay required to remove data despread and correlated during the threshold comparison while receiving data associated with a newly updated PN code sequence.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF PREFERRED EMBODIMENTS

Reference will now be made in detail to the preferred embodiments of the present invention. In the following description of the present invention, a detailed description of known functions and configurations incorporated herein will be omitted when it may make the subject matter of the present invention rather unclear.

Figure 4:
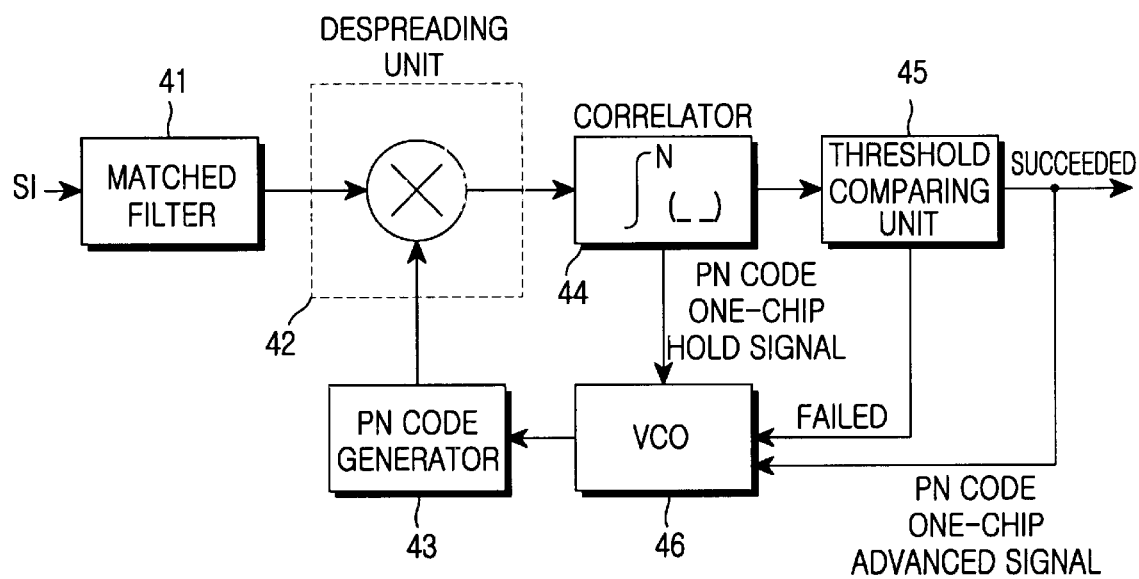
FIG. 4 is a block diagram illustrating the configuration of a PN code acquisition apparatus in accordance with an embodiment of the present invention.

FIG. 4 is a block diagram illustrating the configuration of a PN code acquisition apparatus in accordance with an embodiment of the present invention.

A spread spectrum signal transmitted from a direct sequence spread spectrum system over a radio channel is received in the PN code acquisition apparatus via a receiving antenna and then down converted. The down-converted received signal, which is denoted by the reference character "S1", is inputted at a despreading unit 42 after passing through a matched filter 41 for obtaining a maximum SNR. The despreading unit 42 despreads the received signal by multiplying the signal by a spreading code synchronized therewith so that the signal, which is in a spread modulated state, is demodulated. That is, the despreading unit 42 despreads the matched-filtered, received signal S1 by a PN code generated from a PN code generator 43.

The resultant despread signal is then sent to correlator 44 which, in turn, accumulates the received signal for a certain period of time, Td. A threshold comparing unit 45 receives an output from the correlator 44. The threshold comparing unit 45 compares the output signal from the correlator 44 with a predetermined threshold value, thereby checking whether or not the PN code generated from the PN code generator 43 is synchronized with the spread PN code of the received signal S1. Based on the checked result, the threshold comparing unit 45 determines whether or not the desired PN code is acquired. That is, when it is determined that the output signal from the correlator 44 is higher than the threshold value, it is determined that acquisition of the desired PN code is achieved. When it is determined that the output signal from the correlator 44 is not higher than the threshold value, it is determined that acquisition of a desired PN code has failed.

The correlator 44 sends data correlated for N chips to the threshold comparing unit 45 while simultaneously generating a control signal adapted to hold the PN code sequence by one chip. The control signal, namely, PN code one-chip hold signal, is applied to VCO 46 which, in turn, controls the PN code generator 43 to generate a PN code sequence held by one chip. Accordingly, the received signal S1 is despread in phase with the PN code sequence held by one chip. Even when acquisition of a desired PN code has failed in this case, the threshold comparing unit 45 receives data associated with a new PN code sequence without any delay because the one-chip holding of the PN code sequence has been achieved. Thus, it can be determined without any delay whether or not acquisition of a desired PN code is achieved. Meanwhile, when acquisition of a desired PN code is achieved in the one-chip held state, the threshold comparing unit 45 sends again, to the VCO 46, a control signal adapted to advance the PN code sequence by one chip, thereby adjusting the PN code sequence to an original state.

Figure 1:
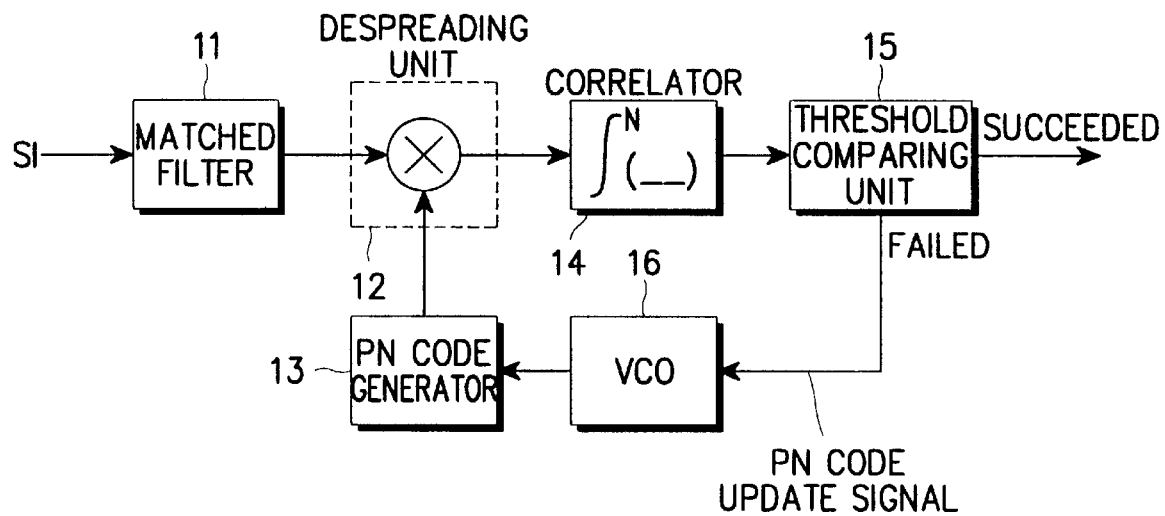
FIG. 1 is a block diagram illustrating the configuration of a conventional PN code acquisition apparatus.
Figure 2:
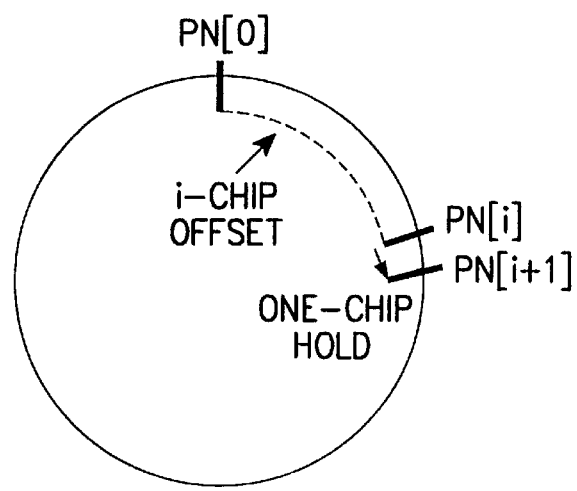
FIG. 2 is a schematic view illustrating the entire period of a PN code sequence in the form of a circle in order to explain updating of PN code sequence.
Figure 3:
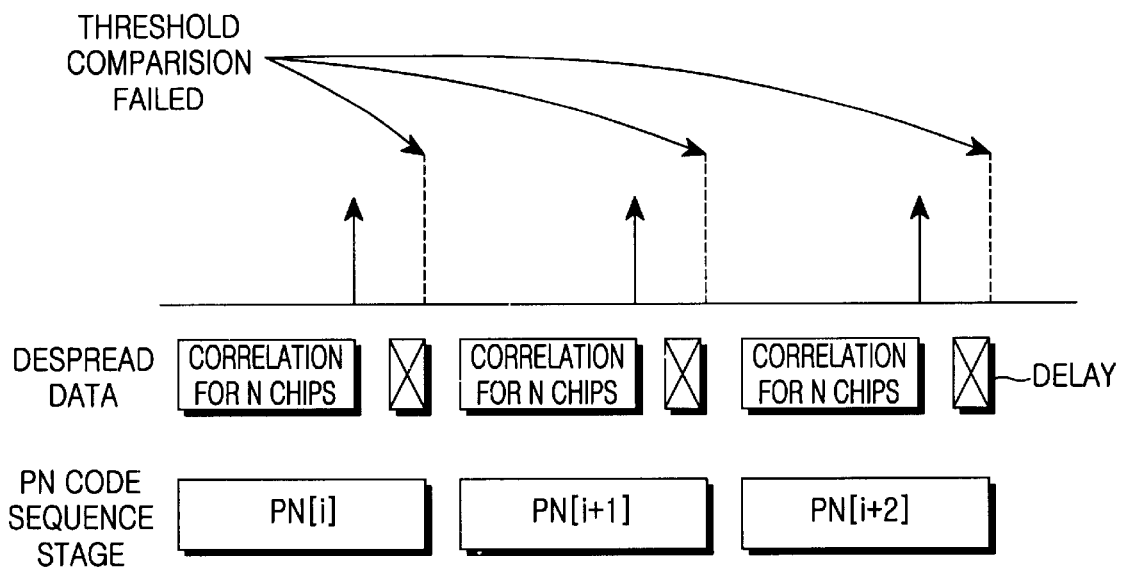
FIG. 3 is a schematic view illustrating a delay resulting from a PN code sequence update operation carried out in a conventional PN code acquisition apparatus.
Figure 5:
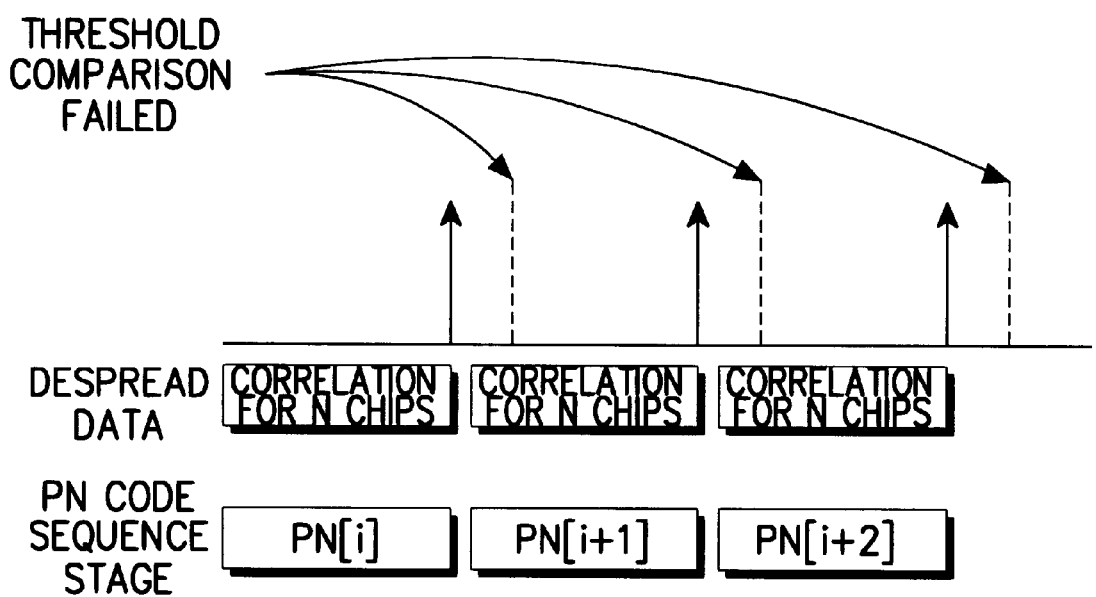
FIG. 5 is a schematic view illustrating a PN code sequence update operation carried out in the PN code acquisition apparatus according to the present invention.

FIG. 5 is a schematic view illustrating a PN code sequence update operation carried out in the PN code acquisition apparatus according to the present invention. Referring to FIG. 5, it can be seen that no delay occurs when the acquisition of a desired PN code is failed, as compared to the case of FIG. 3.

In accordance with the present invention, PN code sequence updating is not conducted after a threshold comparison, but conducted after a correlation for a predetermined number of chips, namely, N chips, as described above. Accordingly, it is possible to eliminate the time delay involved in the conventional case every time acquisition of a desired PN code has failed. Thus, there is an advantage of a reduction in PN code acquisition time.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A pseudo noise code acquisition apparatus in a receiver adapted to receive a spread spectrum modulated signal comprising:

a pseudo noise code sequence generator for generating a pseudo noise code sequence;

a voltage control oscillator for adjusting said pseudo noise code sequence of said pseudo noise code sequence generator;

a despreading unit for despreading said received spread spectrum modulated signal in synchronization with said pseudo noise code sequence;

a correlator for accumulating said despread signal for a predetermined number of chips to derive a correlation value and sending, to said voltage control oscillator, a control signal adapted to hold said pseudo noise code sequence by one chip after each complete correlation of said predetermined number of chips; and a threshold comparing unit for comparing said correlation value output from said correlator with a predetermined threshold value, to determine whether or not acquisition of a desired pseudo noise code sequence is achieved, said threshold comparing unit sending, to said voltage control oscillator, a control signal adapted to advance said pseudo noise code sequence by one chip when it is determined that acquisition of said desired pseudo noise code sequence is achieved.

2. The pseudo noise code acquisition apparatus in accordance with claim 1, wherein said threshold comparing unit determines that acquisition of said desired pseudo noise code sequence is achieved when said correlation value is higher than said predetermined threshold value.

3. A method for pseudo noise code acquisition comprising the steps of:

generating a pseudo noise code sequence;

adjusting said pseudo noise code sequence;

despreading a received spread spectrum modulated signal in synchronization with said generated pseudo noise code sequence to generate a despread signal;

accumulating the despread signal in a correlator for a predetermined number of chips to derive a correlation value for a threshold comparing unit and to provide a first control signal to a voltage control oscillator;

controlling a pseudo noise code sequence generator to delay the pseudo noise code sequence by one chip after each complete correlation of the predetermined number of chips;

comparing the derived correlation value with a predetermined threshold value;

determining whether acquisition of a desired pseudo noise code sequence is achieved based on said comparison; and generating a second control signal to advance the pseudo noise code sequence by one chip when acquisition of the desired pseudo noise code sequence is achieved.

\* \* \* \* \*